(12) United States Patent
Gotoh et al.

(10) Patent No.: US 8,586,392 B2
(45) Date of Patent: Nov. 19, 2013

(54) DISPLAY DEVICE AND MANUFACTURING METHOD THEREOF

(75) Inventors: Jun Gotoh, Mobara (JP); Eisuke Hatakeyama, Mobara (JP); Kenji Anjo, Oamishirasato (JP); Yoshitomo Ogishima, Mobara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 382 days.

(21) Appl. No.: 13/004,048

(22) Filed: Jan. 11, 2011

(65) Prior Publication Data
US 2011/0175096 A1      Jul. 21, 2011

(30) Foreign Application Priority Data

Jan. 15, 2010   (JP) ................................. 2010-006989

(51) Int. Cl.
| | |
|---|---|
| H01L 21/00 | (2006.01) |
| H01L 21/44 | (2006.01) |
| H01L 29/04 | (2006.01) |
| H01L 29/10 | (2006.01) |
| H01L 31/00 | (2006.01) |
| G02F 1/1343 | (2006.01) |

(52) U.S. Cl.
USPC ............... 438/30; 438/608; 438/609; 438/22; 438/29; 257/59; 257/E21.602; 257/E29.117; 257/E23.149; 257/E21.535; 349/139; 349/147

(58) Field of Classification Search
USPC ............. 257/59, E21.602, E29.117, E23.149, 257/E21.535; 438/30, 34, 129, 158, 608, 438/609, 652; 349/139, 147
See application file for complete search history.

(56) References Cited

U.S. PATENT DOCUMENTS 5,621,555 A * 4/1997 Park ................................ 349/54
6,483,099 B1 * 11/2002 Yu et al. ..................... 250/214.1
(Continued)

FOREIGN PATENT DOCUMENTS

| CN | 101257028 | 9/2008 |
|---|---|---|
| JP | 2009-192883 | 8/2009 |

(Continued)

OTHER PUBLICATIONS

Office Action for Korean Patent Application No. 10-2011-3879, dated Dec. 28, 2012 with English Language Translation.

*Primary Examiner* — Chuong A Luu
*Assistant Examiner* — Cory Eskridge
(74) *Attorney, Agent, or Firm* — Antonelli, Terry, Stout & Kraus, LLP.

(57) ABSTRACT

A manufacturing method of a display device including a gate electrode film, a first electrode film, a second electrode film, and a conductive film connected to the first electrode film and formed of a conductive layer including a first conductive layer and a second conductive layer formed overlapping the first conductive layer. The method includes the steps of forming the first electrode film and the second electrode film, forming the conductive layer such that the conductive layer is connected to the first electrode film and the second electrode film, and forming the conductive film by removing regions other than predetermined regions of the conductive layer, wherein the conductive layer forming step includes the steps of forming the first conductive layer on the respective upper surfaces of the first electrode film and the second electrode film and forming the second conductive layer on the upper surface of the first conductive layer.

11 Claims, 10 Drawing Sheets

(56) References Cited

U.S. PATENT DOCUMENTS

| | | |
|---|---|---|
| 2002/0115025 A1* | 8/2002 | Noda et al. .................... 430/329 |
| 2003/0170926 A1* | 9/2003 | Nakayama et al. ............. 438/30 |
| 2005/0104528 A1* | 5/2005 | Seo et al. ................... 315/169.1 |
| 2006/0108587 A1 | 5/2006 | Lee et al. |
| 2006/0197081 A1* | 9/2006 | Tsuchiya ........................ 257/40 |
| 2006/0220018 A1* | 10/2006 | Ahn et al. ....................... 257/59 |
| 2007/0190454 A1 | 8/2007 | Lee et al. |
| 2007/0211331 A1* | 9/2007 | Danner et al. ................ 359/296 |
| 2008/0073649 A1 | 3/2008 | Kim et al. |
| 2009/0059110 A1* | 3/2009 | Sasaki et al. .................... 349/39 |
| 2009/0108264 A1* | 4/2009 | Inoue et al. ..................... 257/59 |
| 2009/0142867 A1* | 6/2009 | Fujikawa et al. ............... 438/30 |
| 2009/0207364 A1 | 8/2009 | Morimoto et al. |

FOREIGN PATENT DOCUMENTS

| | | |
|---|---|---|
| KR | 10-2000-0045317 | 7/2000 |
| KR | 10-2006-0050008 | 5/2006 |
| KR | 10-2007-0081805 | 8/2007 |

* cited by examiner

DISPLAY DEVICE AND MANUFACTURING METHOD THEREOF

CROSS-REFERENCE TO RELATED APPLICATION

The present application claims priority from Japanese patent application JP2010-006989 filed on Jan. 15, 2010, the content of which is hereby incorporated by reference into this application.

BACKGROUND OF THE INVENTION

1. Field of the Invention

The present invention relates to a display device and a manufacturing method thereof.

2. Description of the Related Art

Recently, various types of display devices have been developed due to a demand for a reduction in thickness and an increase in definition of a display device. For example, an in-plane switching (IPS) mode liquid crystal display device is known as the display device.

Figure 8:
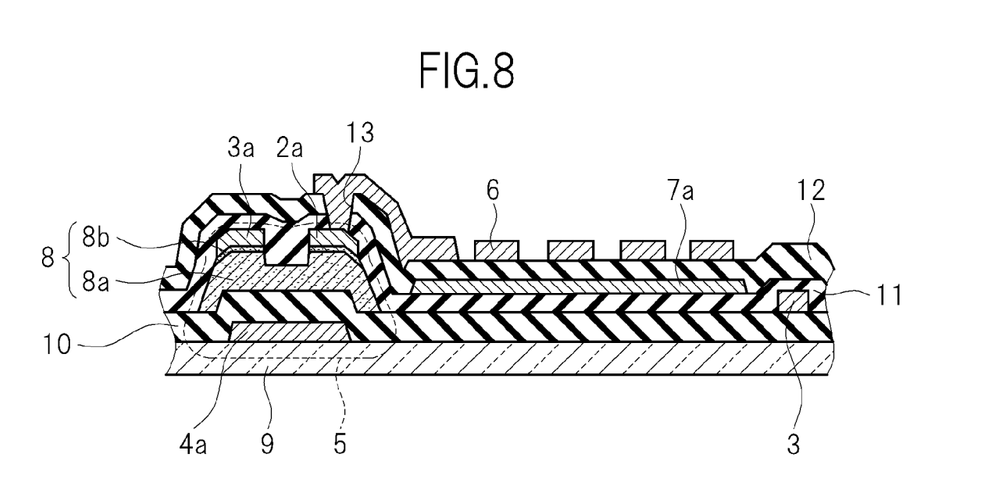
FIG. 8 is a cross-sectional view showing one example of a pixel region provided in a conventional IPS mode liquid crystal display device.

FIG. 8 is a cross-sectional view showing one example of a pixel region provided in a conventional IPS mode liquid crystal display device. As shown in FIG. 8, in order to meet the demand for a reduction in thickness and an increase in definition of a display device, the structure of the conventional IPS mode liquid crystal display device is complicated. Because of the complicated structure, a manufacturing process of the display device is also complicated.

For example, one example of a manufacturing method of the IPS mode liquid crystal display device shown in FIG. 8 includes a lot of steps as follows: forming a gate electrode 4a, a gate insulating film 10, a semiconductor film 8, a source electrode 2a made of, for example, a metal, and a drain electrode 3a made of, for example, a metal on a substrate 9; thereafter forming a passivation film 11 which is an insulating film; forming common electrodes 7a on the upper surface of the passivation film 11; further forming an interlayer insulating film 12 which is another insulating film; forming a through hole 13 penetrating through the passivation film 11 and the interlayer insulating film 12 so as to electrically connect the source electrode 2a to the below-mentioned pixel electrodes 6; and further forming the pixel electrodes 6 using a transparent conductive material such as indium tin oxide (ITO). Such a conventional IPS mode liquid crystal display device is disclosed in, for example, JP 2009-192883 A.

SUMMARY OF THE INVENTION

In order to simplify the complicated structure and manufacturing process of the conventional IPS mode liquid crystal display device, the structure of a display device having: a gate electrode film; a source electrode film and a drain electrode film, both of which are disposed separated from the gate electrode film by an insulating film; and pixel electrodes formed in predetermined regions in contact with the upper surface of the source electrode film (hereinafter referred to as "Lite structure") has been proposed recently.

One example of a manufacturing method of a display device having the Lite structure includes the steps of: forming a gate electrode film, a gate insulating film, a semiconductor film, a source electrode film made of, for example, a metal, and a drain electrode film made of, for example, a metal on a substrate; thereafter forming pixel electrodes in predetermined regions in contact with a part of the source electrode film; then forming a passivation film which is an insulating film; and forming common electrodes on the upper surface of the passivation film, which is simplified as compared with the manufacturing method of a conventional display device.

However, in the manufacturing method of a display device having the Lite structure, it was found that when the pixel electrodes are formed in predetermined regions in contact with a part of the source electrode film, a problem arises that a portion of the formed source electrode film or drain electrode film is lost.

Due to the loss of a portion of the source electrode film or the drain electrode film, the display quality of the display device is deteriorated, and consequently, the yield thereof is decreased. Therefore, it is necessary to form the pixel electrodes while preventing a portion of the source electrode film or the drain electrode film from being lost in the step of forming the pixel electrodes included in the manufacturing method of a display device having the Lite structure.

An object of the invention is to provide a display device in which a portion of a source electrode film or a drain electrode film is prevented from being lost in a step of forming pixel electrodes in predetermined regions in contact with a part of the source electrode film, and a manufacturing method thereof. The above and other objects and novel characteristics of the invention will be apparent from the description of this specification and the accompanying drawings.

The manufacturing method of a display device according to the invention is a manufacturing method of a liquid crystal display device that includes: a gate electrode film; a first electrode film and a second electrode film, both of which are disposed separated from the gate electrode film by an insulating film; and a conductive film which is connected to the first electrode film and is formed of a conductive layer including a first conductive layer and a second conductive layer formed overlapping the first conductive layer. The method includes: an electrode film forming step of forming the first electrode film and the second electrode film; a conductive layer forming step of forming the conductive layer such that the conductive layer is connected to the first electrode film and the second electrode film; and a conductive film forming step of forming the conductive film by removing regions other than predetermined regions of the conductive layer. The conductive layer forming step includes: a first conductive layer forming step of forming the first conductive layer on the respective upper surfaces of the first electrode film and the second electrode film; and a second conductive layer forming step of forming the second conductive layer on the upper surface of the first conductive layer.

Further, the conductive layer forming step may further include a washing step of washing the upper surface of the first conductive layer after the first conductive layer forming step and before the second conductive layer forming step.

Further, the conductive film forming step may include: a resist applying step of applying a resist on the upper surface of the conductive layer; and a resist removing step of removing the resist formed in regions other than the predetermined regions using a remover. Further, the remover may be an alkaline aqueous solution, and the first electrode film and the second electrode film may be formed of a metal. Further, the metal may be chromium, molybdenum, or an alloy thereof. Further, the conductive film may be transmissive to visible light. Further, the first conductive layer and the second conductive layer may be formed of the same material, respectively. Further, the display device may be an in-plane switching mode liquid crystal display device.

Further, the display device according to the invention includes: a gate electrode film; an insulating film provided on the gate electrode film; an electrode film formed of a metal and provided on the insulating film; a first transparent conductive layer connected to the electrode film; and a second transparent conductive layer formed in contact with the first transparent conductive layer.

Further, a location of a lost portion of the first transparent conductive layer may be different from that of the second transparent conductive layer in a plan view.

According to the invention, a display device in which a portion of a source electrode film or a drain electrode film is prevented from being lost in a step of forming pixel electrodes in predetermined regions in contact with a part of the source electrode film, and a manufacturing method thereof are provided.

DETAILED DESCRIPTION OF THE INVENTION

A display device manufactured by a manufacturing method of a display device according to the invention includes: a gate electrode film; a first electrode film and a second electrode film, both of which are disposed separated from the gate electrode film by an insulating film; and a conductive film which is composed of a conductive layer including a first conductive layer formed in contact with the upper surface of the first electrode film and a second conductive layer formed overlapping the first conductive layer and is formed in predetermined regions.

Further, the gate electrode film according to the invention is composed of agate electrode and a gate electrode line. Further, the first electrode film is composed of a first electrode and a first electrode line electrically connected to the first electrode. Further, the second electrode film is composed of a second electrode and a second electrode line electrically connected to the second electrode.

The manufacturing method of a display device according to the invention can also be preferably used as a manufacturing method of, for example, an in-plane switching (IPS) mode liquid crystal display device 1.

Figure 1:
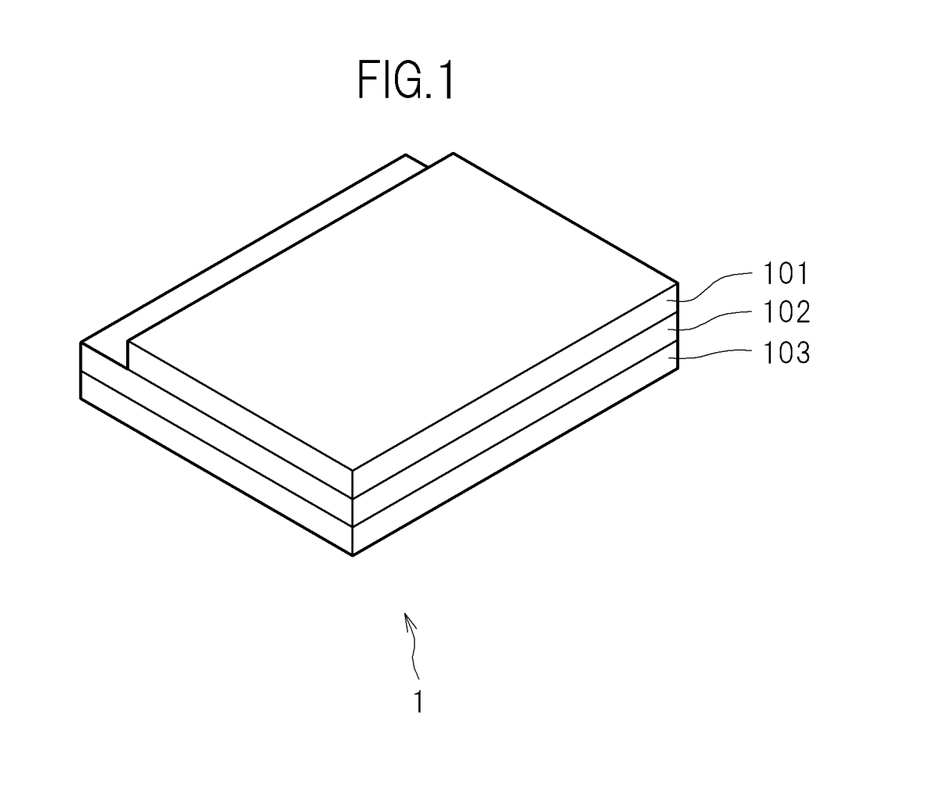
FIG. 1 is an overall perspective view of a liquid crystal display device according to an embodiment of the invention.

FIG. 1 is an overall perspective view of a liquid crystal display device 1 according to an embodiment of the invention. As shown in FIG. 1, the liquid crystal display device 1 includes: a thin-film transistor (TFT) substrate 102 on which a gate electrode film 4, a source electrode film (first electrode film) 2, a drain electrode film (second electrode film) 3, pixel electrodes (conductive film) 6, common electrodes 7a, all of which will be described below, and the like are arranged; a filter substrate 101 which faces the TFT substrate 102 and is provided with a color filter; a liquid crystal material (not shown) enclosed in a region sandwiched between the two substrates; and a backlight 103 disposed in contact with the TFT substrate 102 on the opposite side from the filter substrate 101.

Figure 2:
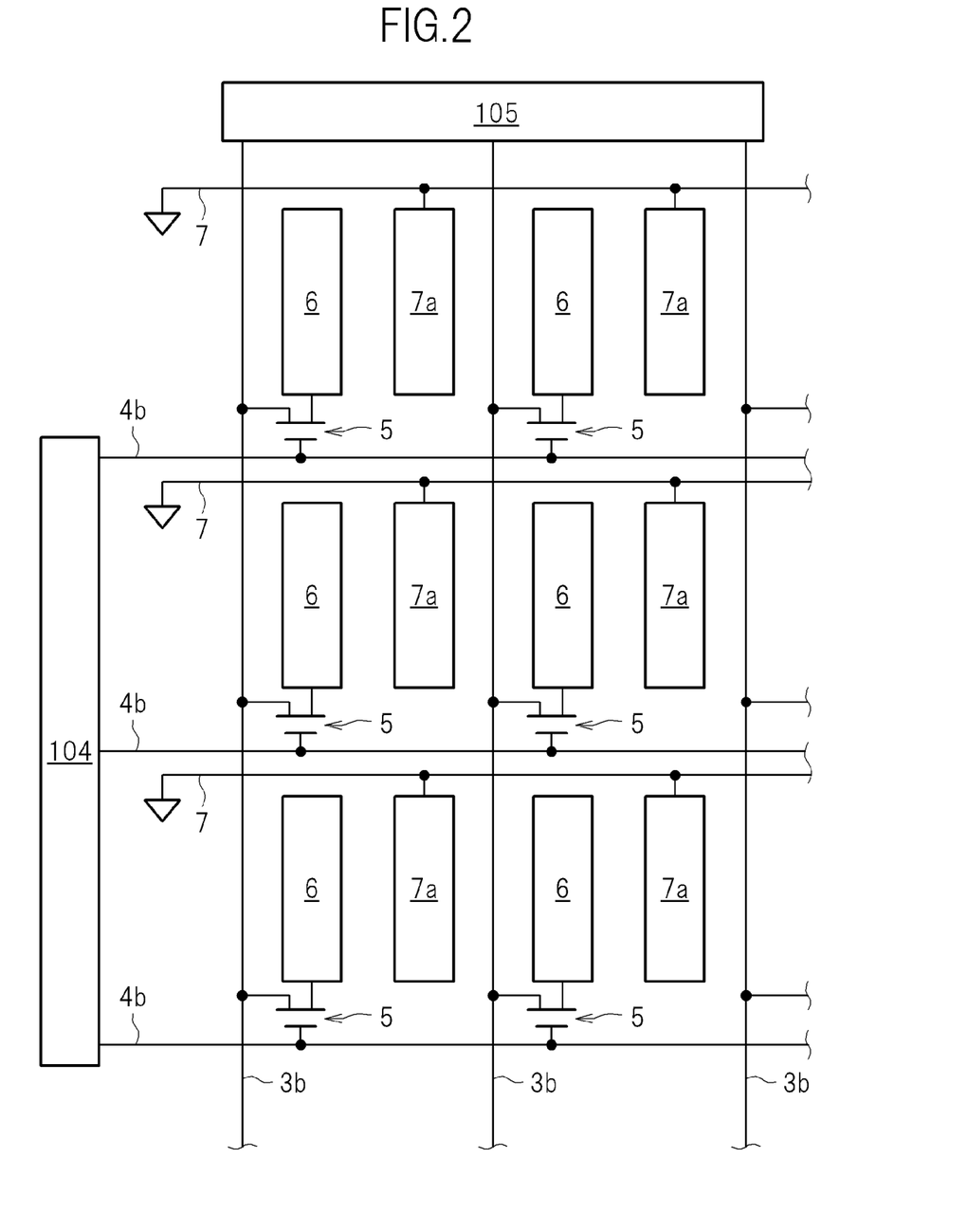
FIG. 2 is a conceptual view of an equivalent circuit of a TFT substrate of a liquid crystal display device according to an embodiment of the invention.

FIG. 2 is a conceptual view of an equivalent circuit of the TFT substrate 102 of the liquid crystal display device 1 according to an embodiment of the invention. In the TFT substrate 102 in FIG. 2, a lot of gate electrode lines 4b connected to a gate driver 104 are arranged at equal intervals extending in the horizontal direction in the drawing in a display panel serving as a display portion, and a lot of drain electrode lines (second electrode lines) 3b connected to a data driver 105 are arranged at equal intervals extending in the vertical direction in the drawing in the display panel serving as a display portion.

Then, pixel regions arranged in a matrix pattern are partitioned by these gate electrode lines 4b and drain electrode lines 3b, respectively. These pixel regions constitute the display panel serving as a display portion. Further, common signal lines 7 extend in the horizontal direction in the drawing in parallel to the respective gate electrode lines 4b.

A thin-film transistor 5 is formed at a corner of each pixel region partitioned by the gate electrode lines 4b and the drain electrode lines 3b, and is connected to the drain electrode line 3b and the pixel electrode 6. Further, a gate electrode 4a of the thin-film transistor 5 is connected to the gate electrode line 4b. In each pixel region, a common electrode 7a is formed such that the common electrode 7a is connected to the corresponding common signal line 7 and faces the pixel electrode 6.

Incidentally, each thin-film transistor 5 includes the gate electrode 4a, and a source electrode (first electrode) 2a and a drain electrode (second electrode) 3a, both of which are separated from the gate electrode 4a by a gate insulating film 10.

In the above-mentioned circuit configuration, a reference voltage is applied to the common electrode 7a of each pixel circuit via the common signal line 7. Further, a gate voltage is selectively applied to the gate electrode 4a of the thin-film transistor 5 according to a gate signal supplied to the gate electrode line 4b and a current flowing through the thin-film transistor 5 is controlled.

A voltage of a video signal supplied to the drain electrode line 3b via the thin-film transistor 5 in which the gate voltage is selectively applied to the gate electrode 4a is selectively applied to the pixel electrode 6. This generates a potential difference between the pixel electrode 6 and the common electrode 7a. An electric field formed by this potential difference has a component in the horizontal direction (the direction parallel to the TFT substrate 102), and the orientation and the like of liquid crystal molecules are controlled by the electric field of the component in the horizontal direction (horizontal electric field). In this manner, the shielding amount of light from the backlight 103 is controlled, and an image is displayed.

Subsequently, one of the pixel regions of the liquid crystal display device 1 according to an embodiment of the invention will be described in more detail. Each pixel region of the liquid crystal display device 1 includes: a gate electrode 4a included in a gate electrode film 4; a source electrode (first electrode) 2a included in a source electrode film (first electrode film) 2 and a drain electrode (second electrode) 3a included in a drain electrode film (second electrode film) 3, both of which are disposed separated from the gate electrode 4a by a gate insulating film 10; and a pixel electrode (conductive film) 6 which is composed of a conductive layer including a first conductive layer 6a formed in contact with the upper surface of the source electrode film 2 and a second conductive layer 6b formed overlapping the first conductive layer 6a and is formed in predetermined regions.

Figure 3A:
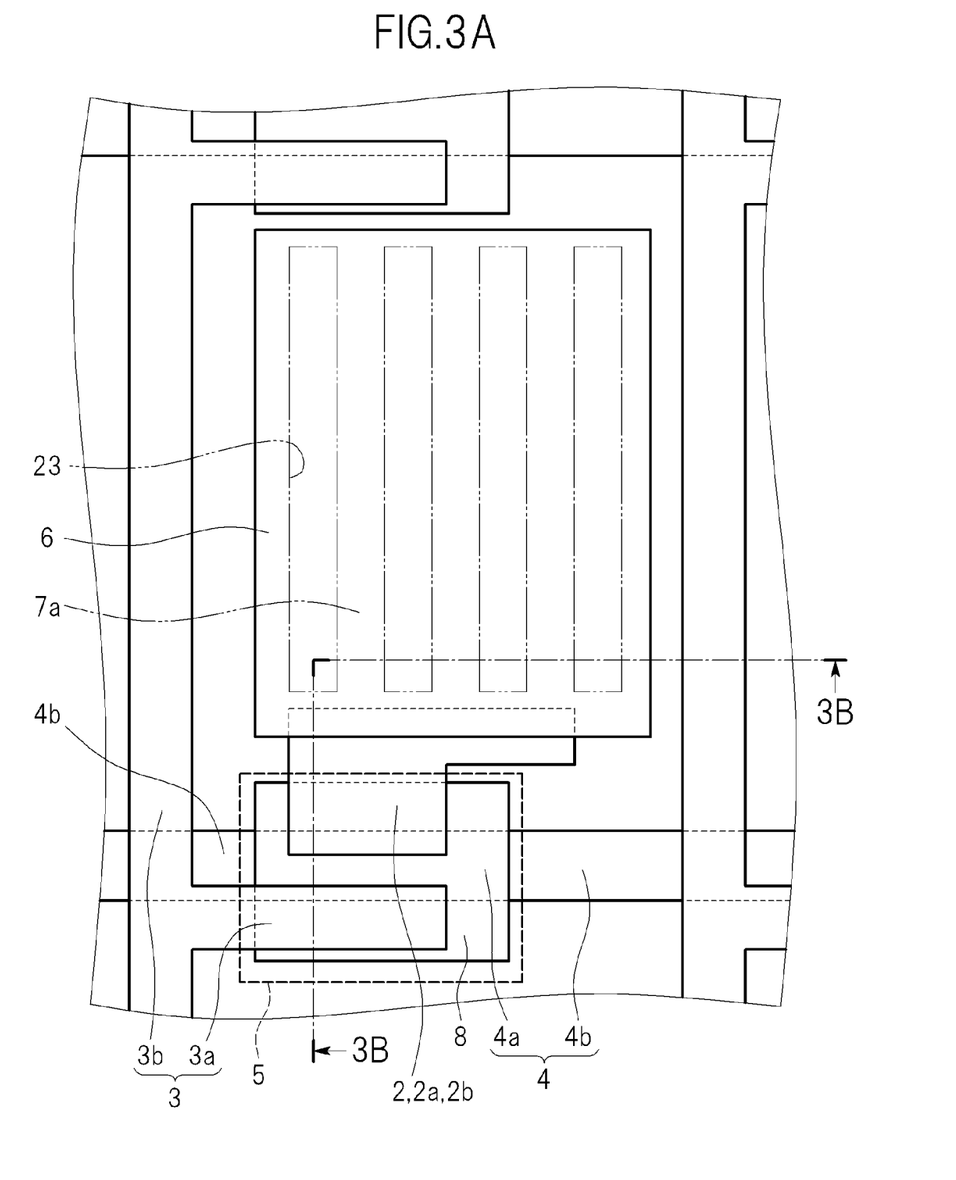
FIG. 3A is an enlarged plan view of one pixel region of a liquid crystal display device according to an embodiment of the invention.

FIG. 3A is an enlarged plan view of one pixel region of the liquid crystal display device 1 according to an embodiment of the invention. As shown in FIG. 3A, the gate electrode film 4 is formed as a strip-shaped film extending in the horizontal direction in the drawing. A part of the gate electrode film 4 which is formed on the lower side of a semiconductor film 8 is designated as the gate electrode 4a and the other part thereof is designated as the gate electrode line 4b.

Further, the drain electrode film 3 is formed of a strip-shaped film extending in the vertical direction in the drawing and a film branching and extending from the strip-shaped film. A part of the drain electrode film 3 formed on the upper side of the semiconductor film 8 is designated as the drain electrode 3a and the other part thereof is designated as the drain electrode line 3b. Further, a part of the source electrode film 2 formed on the upper side of the semiconductor film 8 is designated as the source electrode 2a and the other part thereof is designated as a source electrode line (first electrode line) 2b.

Further, as shown in FIG. 3A, the pixel electrode 6 extends in the shape of a rectangle overlapping a part of the upper surface of the source electrode film 2. That is, a part of the pixel electrode 6 and a part of the upper surface of the source electrode film 2 are electrically and physically in contact with each other, and the pixel electrode 6 is formed extending to a region where the source electrode film 2 is not formed. Further, on the upper side of the pixel electrode 6, a passivation film (not shown) is formed over the entire drawing.

Further, on the upper side of the passivation film, a common electrode film made of ITO is formed over the entire FIG. 3A. The formed common electrode film has a plurality of slit-shaped openings 23. The plurality of the slit-shaped openings 23 are indicated by two-dot dashed lines in FIG. 3A. Incidentally, on the lower side of the common electrode film, the pixel electrode 6 formed in a rectangular shape is disposed.

Further, a part of the common electrode film formed on the upper side of the pixel electrode 6 is designated particularly as a common electrode 7a. That is, the common electrode 7a is a region obtained by removing the regions of the plurality of the slit-shaped openings 23 from the rectangular region facing the pixel electrode 6.

Incidentally, the regions other than the common electrode 7a of the common electrode film extending over the entire drawing of FIG. 3A function as common signal lines.

Figure 3B:
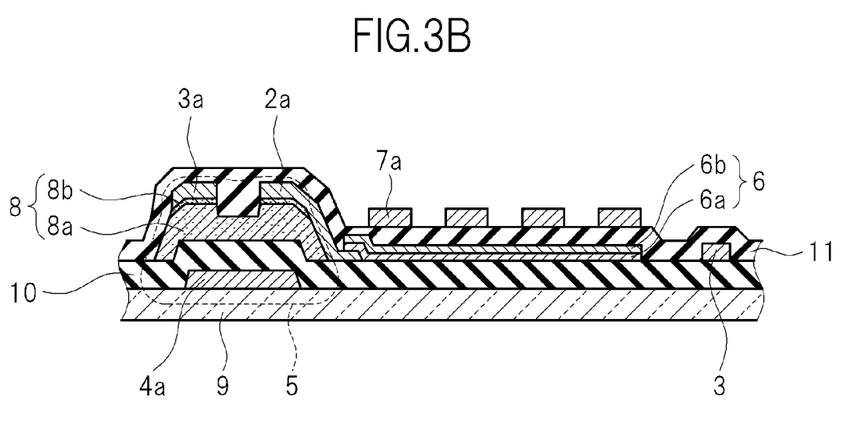
FIG. 3B is a schematic cross-sectional view taken along the line 3B-3B of FIG. 3A.

FIG. 3B is a schematic cross-sectional view taken along the line 3B-3B of FIG. 3A. Incidentally, FIG. 3B is a schematic view with emphasis on the structures of main parts and does not correspond one-to-one to the cross-section taken along the line 3B-3B of FIG. 3A. For example, the common signal lines are not shown in FIG. 3B.

As shown in FIG. 3B, the liquid crystal display device 1 according to an embodiment of the invention has a characteristic that the pixel electrode 6 provided in the liquid crystal display device 1 is formed such that a part thereof is in contact with the source electrode film 2 and includes two layers: the first conductive layer 6a and the second conductive layer 6b.

On the substrate 9, the gate electrode 4a is provided. Further, on the upper side of the gate electrode 4a, the semiconductor film 8 composed of an amorphous silicon layer 8a and an impurity silicon semiconductor film layer 8b is provided with the gate insulating film 10 interposed therebetween. Further, the drain electrode 3a and the source electrode 2a, both of which are made of a metal, are provided in contact with a part of the upper surface of the semiconductor film 8.

The impurity silicon semiconductor film layer 8b is made of amorphous silicon doped with impurities such as phosphorus. The impurity silicon semiconductor film layer 8b functions as an ohmic contact to the drain electrode 3a and the source electrode 2a. Further, the drain electrode 3a and the source electrode 2a are electrically shielded from each other. Incidentally, the term "ohmic contact" refers to an electrical contact region between a wiring layer and a semiconductor layer or the like that has a linear current-voltage characteristic.

Further, a passivation film 11 made of, for example, silicon nitride is formed so as to cover the upper surfaces of the source electrode film 2, the drain electrode film 3, the pixel electrode 6, and the semiconductor film 8. Then, the common electrode 7a made of, for example, ITO is formed so as to cover a part of the passivation film 11. Because of the passivation film 11, the common electrode 7a is electrically insulated from the source electrode film 2, the drain electrode film 3, the pixel electrode 6, and the semiconductor film 8.

Further, it is preferred that the pixel electrode 6 included in the liquid crystal display device 1 according to an embodiment of the invention is transmissive to visible light. That is, it is preferred that both of the first conductive layer 6a and the second conductive layer 6b are transmissive to visible light and are formed of, for example, ITO, indium zinc oxide (InZnO), zinc oxide (ZnO), tin oxide ($SnO_2$), or the like, respectively. By using the pixel electrode 6 which is transmissive to visible light, the display quality of the display device can be improved.

Further, it is preferred that the first conductive layer 6a and the second conductive layer 6b are formed of the same material, respectively. For example, the first conductive layer 6a and the second conductive layer 6b may be formed of ITO, respectively. By forming the first conductive layer 6a and the second conductive layer 6b of the same material, respectively, light scattering or the like at the interface between the first conductive layer 6a and the second conductive layer 6b can be prevented from occurring, and also, the visible light transmittance can be prevented from decreasing. Incidentally, the materials described above are only examples illustrating the material capable of forming the first and second conductive layers 6a and 6b, and the material is not limited thereto.

Further, it is preferred that the metal to be used for forming the drain electrode 3a and the source electrode 2a included in the liquid crystal display device 1 according to an embodiment of the invention is chromium, molybdenum, or an alloy thereof. Further, a metal other than chromium, molybdenum, and an alloy thereof, for example, aluminum, tungsten, titanium, tantalum, an alloy thereof, or the like may be used to form the drain electrode 3a and the source electrode 2a.

It is preferred to form the drain electrode 3a and the source electrode 2a of a metal from the viewpoint of conductivity. Further, it is necessary that a compound to be used for forming a layer on the upper surfaces of the drain electrode 3a and the source electrode 2a be a compound having a melting point lower than that of the metal to be used for forming the drain electrode 3a and the source electrode 2a. Since chromium, molybdenum, or an alloy thereof has a relatively high melting point, a desired layer can be formed on the upper surfaces of the drain electrode 3a and the source electrode 2a by suitably selecting a compound from various compounds.

Incidentally, the materials described above are only examples illustrating the material capable of forming the drain electrode 3a and the source electrode 2a, and the material is not limited thereto.

Further, in the semiconductor film 8 included in the liquid crystal display device 1 according to an embodiment of the invention, amorphous silicon is used, however, for example, polysilicon (polycrystalline silicon), microcrystalline silicon, or the like can also be preferably used. Incidentally, the materials described above are only examples illustrating the material capable of forming the semiconductor film 8, and the material is not limited thereto.

Further, as the substrate 9 included in the liquid crystal display device 1 according to an embodiment of the invention, any substrate can be preferably used as long as it is transmissive to visible light, exhibits low thermal shrinkage, and has excellent chemical resistance. For example, as the substrate 9, a glass substrate formed of aluminosilicate glass, aluminoborosilicate glass, or the like can be preferably used. Incidentally, the materials described above are only examples illustrating the material capable of forming the substrate 9, and the material is not limited thereto.

Further, the liquid crystal display device 1 according to an embodiment of the invention includes the pixel electrode 6 formed in a predetermined region in contact with a part of the source electrode film 2 made of a metal or the like, and has a bottom gate structure in which the gate electrode 4a is disposed on the lower side of the drain electrode 3a and the source electrode 2a. However, it is not limited to the bottom gate structure, and the structure in which the pixel electrode 6 is formed in a predetermined region in contact with a part of the source electrode film 2 made of a metal or the like can also be applied to another thin-film transistor structure.

Further, the liquid crystal display device 1 according to an embodiment of the invention has the backlight 103 on the lower side of the substrate 9, however, it is also possible to suitably change it to, for example, an edge light-type backlight, a backlight for letting in light, a front-type backlight, or the like.

In the liquid crystal display device 1 according to an embodiment of the invention shown in FIG. 3B, it is not necessary to form a through hole 13, the number of layers to be formed can be reduced, and so on, and therefore, the manufacturing process is expected to be simplified to a large extent as compared with a conventional liquid crystal display device shown in FIG. 8. The main characteristic of the liquid crystal display device 1 according to an embodiment of the invention is that it has a structure in which the pixel electrode 6 is formed in contact with a part of the source electrode 2a.

However, when the pixel electrode 6 is formed such that apart thereof is connected to the source electrode 2a, there arises a problem in a conventional manufacturing process that a defect is caused such that a part of the first and/or second electrode film is dissolved due to the exposure to a remover used in the manufacturing process.

Figure 3C:
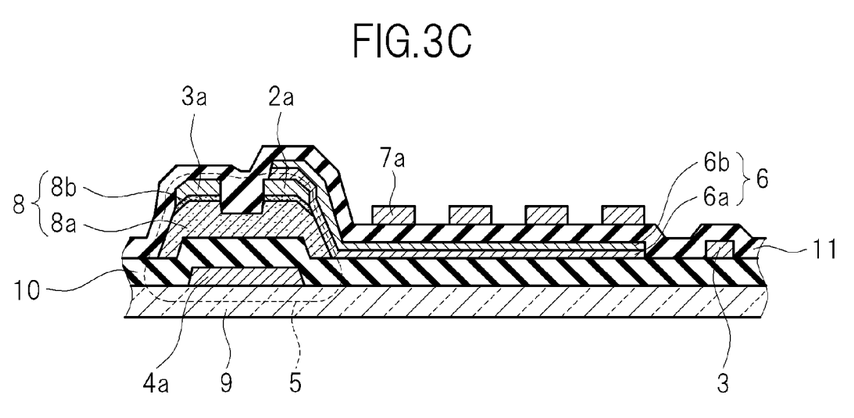
FIG. 3C is a schematic cross-sectional view showing another example of a liquid crystal display device according to an embodiment of the invention.

FIG. 3C is a schematic cross-sectional view showing another example of the liquid crystal display device 1 according to an embodiment of the invention. As shown in FIG. 3C, the pixel electrode 6 extends overlapping a part of the upper surface of the source electrode 2a. That is, a part of the pixel electrode 6 and a part of the upper surface of the source electrode 2a are directly and electrically in contact with each other, and the pixel electrode 6 may be formed extending to a region where the source electrode 2a is not formed.

FIGS. 4A to 4H are views showing manners of manufacturing the liquid crystal display device 1 according to an embodiment of the invention. FIGS. 4A to 4H show a manufacturing method of the liquid crystal display device 1 according to an embodiment of the invention in the case where the device 1 has a structure shown in FIG. 3C.

The manufacturing method of the liquid crystal display device 1 according to an embodiment of the invention includes: an electrode film forming step of forming the source electrode film 2 and the drain electrode film 3; a conductive layer forming step of forming the conductive layer 60 such that the conductive layer 60 is connected to the source electrode film 2 and the drain electrode film 3; and a conductive film forming step of forming the pixel electrodes 6 by removing regions other than predetermined regions of the conductive layer 60.

Further, the conductive layer forming step includes: a first conductive layer forming step of forming the first conductive layer 6a on the respective upper surfaces of the source electrode film 2 and the drain electrode film 3; and a second conductive layer forming step of forming the second conductive layer 6b on the upper surface of the first conductive layer 6a.

In addition, the conductive layer forming step preferably further includes a washing step of washing the upper surface of the first conductive layer 6a after the first conductive layer forming step and before the second conductive layer forming step.

The washing step is performed for removing fine particles, contaminants at the molecular level, and the like on the upper surface of the first conductive layer 6a. By removing such fine particles and contaminants at the molecular level, pattern defects in the display device, deterioration of the characteristics of elements due to contaminants, etc. can be prevented.

Figure 4A:
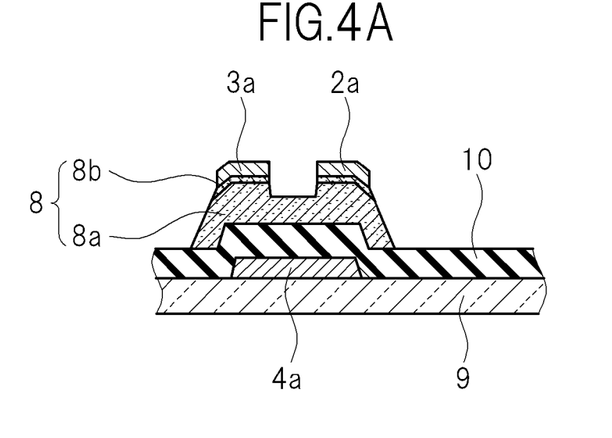
FIG. 4A is a view showing a manner of manufacturing a liquid crystal display device according to an embodiment of the invention.

FIG. 4A is a view showing a state before performing the conductive layer forming step where the source electrode 2a and the drain electrode 3a are formed by a given manufacturing method in the electrode film forming step.

Before performing the electrode film forming step, first, the gate electrode 4a, the gate insulating film 10, and the semiconductor film 8 are formed in this order on the upper surface of the substrate 9, for example, by chemical vapor deposition (CVD), physical vapor deposition (PVD), or the like, followed by photolithography and etching, whereby the electrode film is formed.

The source electrode film 2 and the drain electrode film 3 to be formed in the electrode film forming step are formed by, for example, forming a film by CVD, PVD, or the like, followed by photolithography and etching.

The source electrode 2a and the source electrode line 2b, which constitute the source electrode film 2, are formed in the same step. That is, the source electrode 2a and the source electrode line 2b are formed by forming the source electrode film 2. Further, the drain electrode 3a and the drain electrode line 3b are also formed by forming the drain electrode film 3.

Further, the source electrode film 2 and the drain electrode film 3 may be formed in the same step or may be formed independently in different steps. That is, the electrode film forming step may include a first electrode film forming step of forming the source electrode film (first electrode film) 2 and a second electrode film forming step of forming the drain electrode film (second electrode film) 3.

Subsequently, the conductive layer forming step will be described with reference to FIGS. 4B and 4C.

Figure 4B:
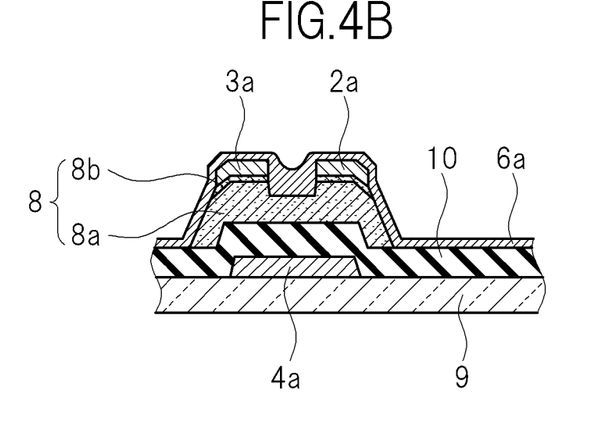
FIG. 4B is a view showing a manner of manufacturing a liquid crystal display device according to an embodiment of the invention.

FIG. 4B is a view showing the step of forming the first conductive layer 6a in contact with the respective upper surfaces of the source electrode film 2 and the drain electrode film 3 formed in the electrode film forming step. The first conductive layer 6a according to this embodiment is formed using ITO. First, by sputtering ITO, the first conductive layer 6a is formed in a region including predetermined regions where the pixel electrodes 6 are formed.

After forming the first conductive layer 6a, the washing step is performed. Incidentally, the washing step is performed by brush scrub washing, high-pressure jet washing, ultrasonic washing, a drying treatment, or the like, however, it is not limited to these methods.

Figure 4C:
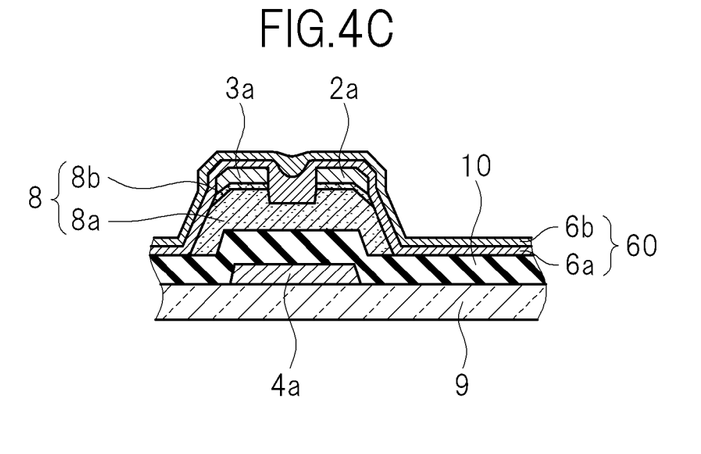
FIG. 4C is a view showing a manner of manufacturing a liquid crystal display device according to an embodiment of the invention.

FIG. 4C is a view showing the step of forming the second conductive layer 6b covering the upper surface of the first conductive layer 6a after performing the above-mentioned washing step. The second conductive layer 6b according to this embodiment is formed using ITO. By sputtering ITO so as to cover the upper surface of the first conductive layer 6a, the second conductive layer 6b according to this embodiment is formed.

Further, in order to remove fine particles, contaminants at the molecular level, and the like on the upper surface of the second conductive layer 6b, the upper surface of the second conductive layer 6b may be subjected to a washing step in the same manner as in the case of the first conductive layer 6a.

Further, in this embodiment, the first conductive layer 6a and the second conductive layer 6b are formed to have the same layer thickness, however, they may be formed to have different layer thicknesses.

Subsequently, the conductive film forming step will be described with reference to FIGS. 4D, 4E, and 4F.

The conductive film forming step is a step of forming the pixel electrodes 6 composed of the conductive layer 60 in the above-mentioned predetermined regions by removing regions other than the predetermined regions of the conductive layer 60. Here, the term "predetermined regions" refers to regions where the pixel electrodes 6 are formed in the liquid crystal display device 1.

In the manufacturing method of the display device according to an embodiment of the invention, it is preferred that the conductive film forming step of forming the pixel electrodes 6 by removing regions of the formed conductive layer 60 other than the regions where the pixel electrodes 6 are formed includes: a resist applying step of applying a resist on the upper surface of the conductive layer 60; and a resist removing step of removing the resist formed in regions other than the predetermined regions using a remover.

By incorporating the resist applying step and the resist removing step, the conductive film forming step of forming the pixel electrodes 6 can be performed more simply and more accurately. Further, by incorporating the resist applying step and the resist removing step in the conductive film forming step, in the step of forming the pixel electrodes 6 in the predetermined regions in contact with a part of the source electrode film 2, an effect of preventing a portion of the source electrode film 2 or the drain electrode film 3 from being lost is increased.

Further, the term "resist" as used herein refers to a material capable of forming a protective film which can be removed by, for example, a remover on at least a part of the surface of the conductive layer 60. After applying the resist by a given method, a part of the resist is removed using, for example, a remover, whereby only a predetermined part of the conductive layer 60 can be treated.

In this embodiment, a photoresist 20 is used as the resist, and a developer is used as the remover.

Figure 4D:
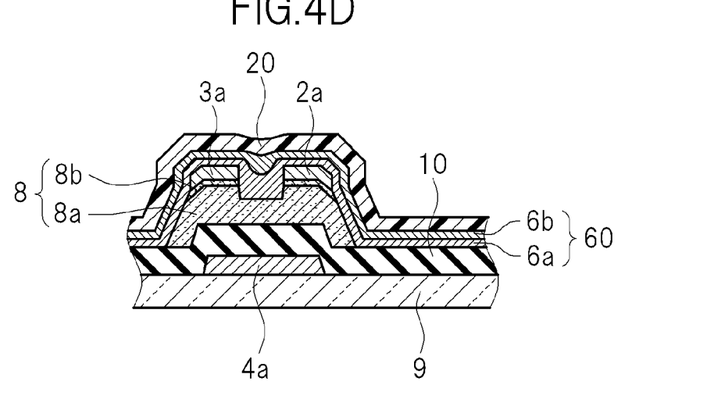
FIG. 4D is a view showing a manner of manufacturing a liquid crystal display device according to an embodiment of the invention.
Figure 4E:
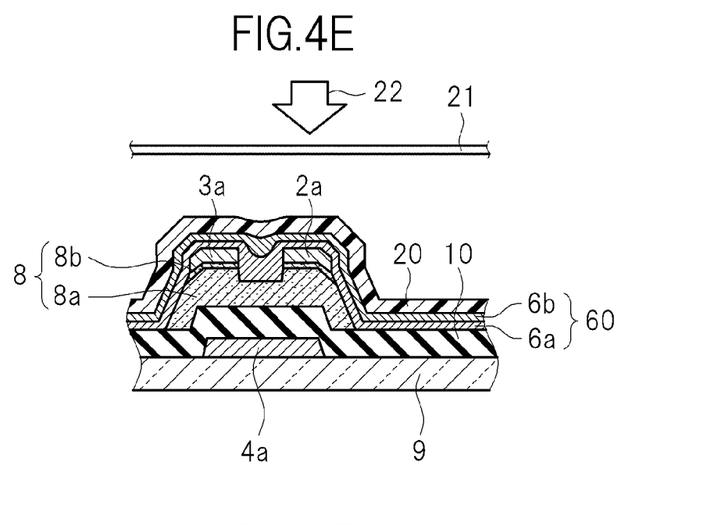
FIG. 4E is a view showing a manner of manufacturing a liquid crystal display device according to an embodiment of the invention.
Figure 4F:
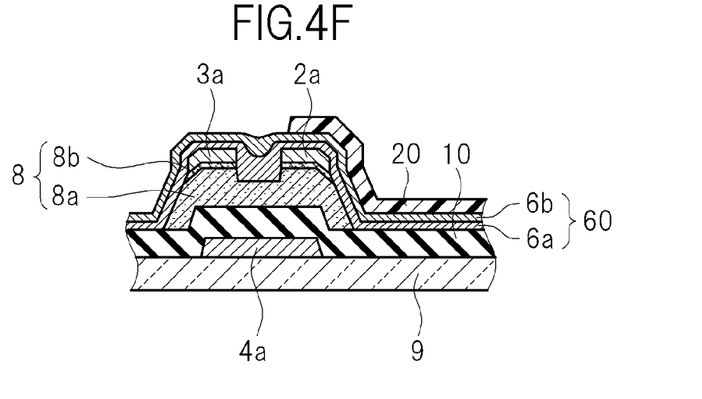
FIG. 4F is a view showing a manner of manufacturing a liquid crystal display device according to an embodiment of the invention.

FIGS. 4D to 4F are views showing a photolithography step. The photolithography step includes an applying step, a light exposing step, and a developing step. FIG. 4D is a view showing a step of applying a photoresist (photosensitive material) 20 (applying step); FIG. 4E is a view showing a step of exposing light 22 having a predetermined wavelength through a photomask 21 onto the applied photoresist (light exposing step); and FIG. 4F is a view showing a step of developing the photoresist with a developer (developing step). Hereinafter, the photolithography step will be described.

FIG. 4D is a view showing the applying step of applying the photoresist (photosensitive material) 20 to the surface of the formed second conductive layer 6b. The photoresist 20 is applied using a spin coater, a slit coater, or the like.

Subsequently, as shown in FIG. 4E, the light exposing step of irradiating light 22 having a predetermined wavelength from the upper side onto the surface to which the photoresist 20 is applied through the photomask 21. The light 22 having a predetermined wavelength can be obtained using, for example, a semiconductor laser, a metal halide lamp, a high-pressure mercury lamp, or the like as a light source.

FIG. 4F is a view showing the developing step of removing a part of the photoresist 20 by developing the photoresist 20 (exposing the photoresist 20 to the developer) after the light exposure treatment. The development can be performed by a method appropriately selected from shower development, dip development, paddle development, and the like.

Figure 4G:
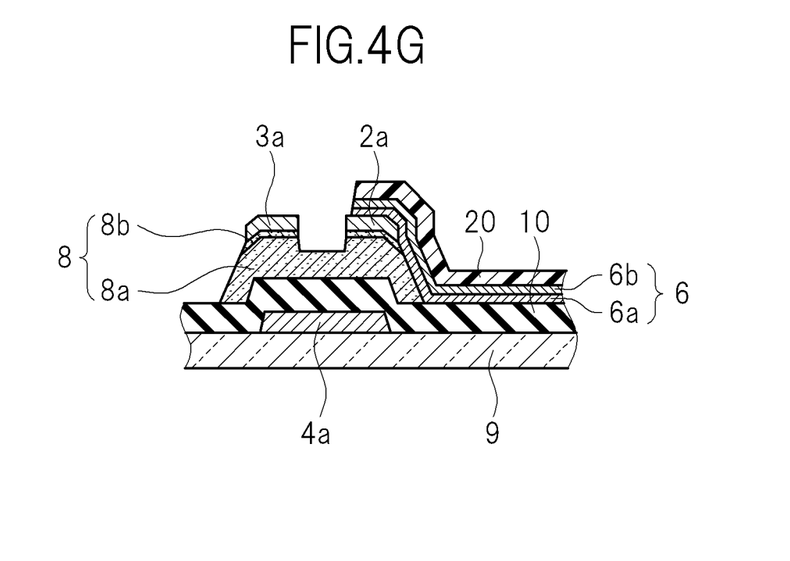
FIG. 4G is a view showing a manner of manufacturing a liquid crystal display device according to an embodiment of the invention.

FIG. 4G is a view showing a conductive layer etching step of removing unnecessary regions of the conductive layer 60 (the first conductive layer 6a and the second conductive layer 6b) by an etching treatment for forming the pixel electrodes (conductive film) 6 in a predetermined pattern after the development.

Figure 4H:
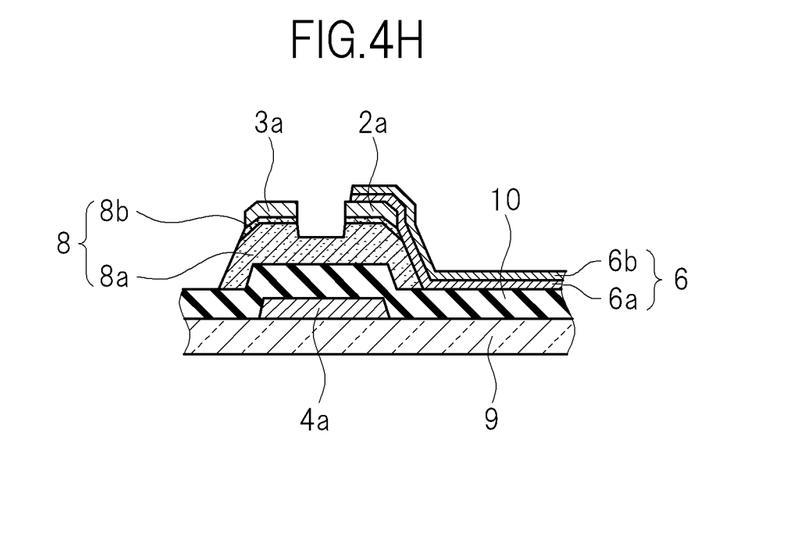
FIG. 4H is a view showing a manner of manufacturing a liquid crystal display device according to an embodiment of the invention.

After the conductive layer etching step, unnecessary photoresist 20 remaining on the pattern of the pixel electrodes 6 is removed. FIG. 4H is a view showing a state after removing the unnecessary photoresist 20 remaining on the pattern of the pixel electrodes 6. The unnecessary photoresist 20 can be removed by a method appropriately selected from wet removal, plasma ashing, ozone ashing, and the like.

As shown in FIGS. 4D to 4H, by further incorporating the photolithography step of applying the photoresist 20 onto the second conductive layer 6b, exposing light, and developing the photoresist; and the conductive film forming step of forming the pixel electrodes 6 by removing the conductive layer 60 including the first conductive layer 6a and the second conductive layer 6b formed in regions other than the predetermined regions through etching of the first conductive layer 6a and the second conductive layer 6b after the second conductive layer forming step, the pixel electrodes 6 can be formed in the predetermined regions.

Subsequently, a manufacturing method of a display device including the thin-film transistor 5 having the source electrode 2a, the drain electrode 3a, and the gate electrode 4a, and the pixel electrodes 6 formed such that a part thereof is connected to the source electrode 2a in the case where the pixel electrodes 6 are formed of a conductive layer composed only of the first conductive layer 6a without performing the manufacturing method of a display device according to an embodiment of the invention will be described with reference to FIGS. 5A, 5B, 6A, and 6B.

Figure 5A:
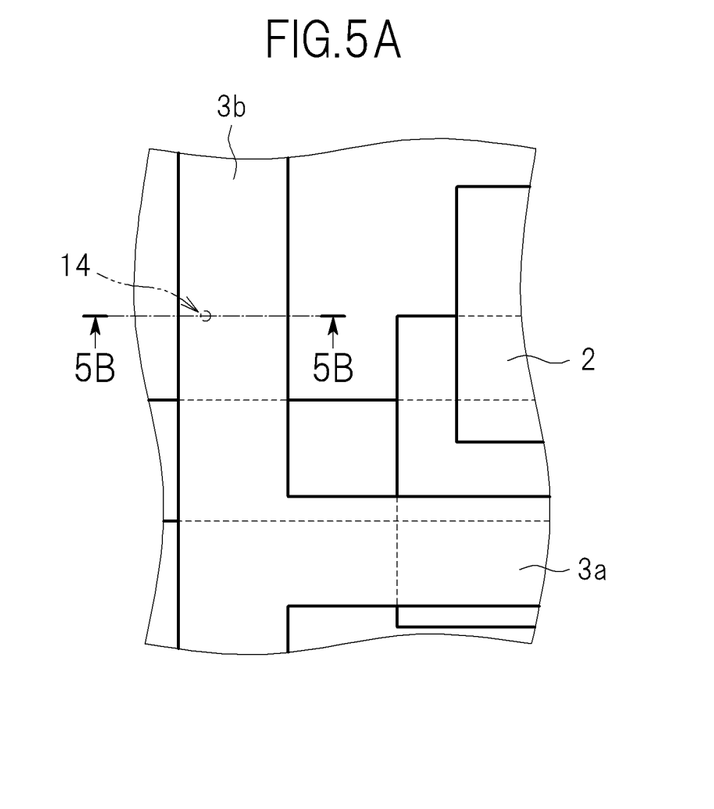
FIG. 5A is a plan view showing the vicinity of a second electrode line in a state before a development treatment in the case where a conductive film is formed of a conductive layer composed only of a first conductive layer.
Figure 5B:
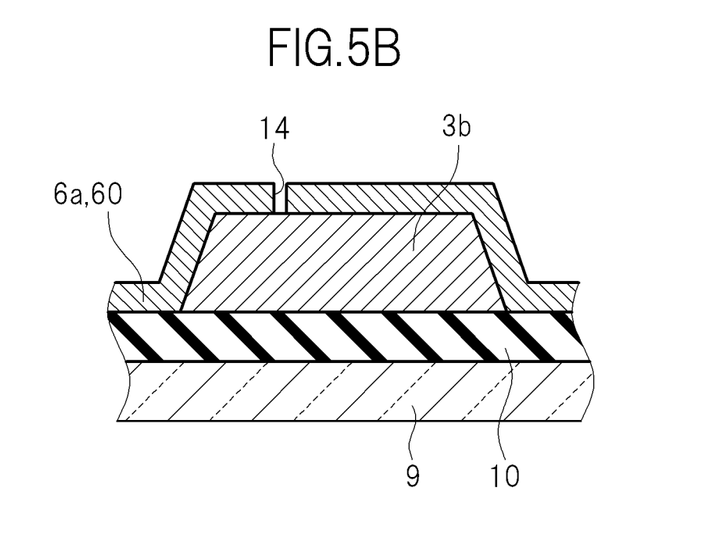
FIG. 5B is a cross-sectional view taken along the line 5B-5B of FIG. 5A.

FIG. 5A is a plan view showing the vicinity of the drain electrode line 3b in a state before the development treatment in the case where the pixel electrode 6 is supposedly formed of a conductive layer composed only of the first conductive layer 6a. Incidentally, a region in the vicinity of the drain electrode line 3b shown in FIG. 5A corresponds to a region other than the predetermined region where the pixel electrode 6 is formed. FIG. 5B is a cross-sectional view taken along the line 5B-5B of FIG. 5A. In such a case, the pixel electrode 6 is formed only through the first conductive layer forming step, and therefore, the conductive layer is composed of the first conductive layer 6a as shown in FIG. 5B.

In the first conductive layer 6a formed by, for example, sputtering ITO or the like, a pinhole 14 is sometimes formed randomly. As shown in FIG. 5B, as the pinhole 14, a small hole penetrating through the first conductive layer 6a is formed, and a part of the surface of the drain electrode line 3b is exposed to the outside through the pinhole 14.

When the photolithography step (a treatment in which the photoresist 20 is applied, light is exposed, and the photoresist 20 is developed) is performed in such a state, a region where the photoresist 20 is removed includes a region of a part of the upper side of the drain electrode 3a and the drain electrode line 3b connected to the drain electrode 3a. Therefore, the developer penetrates into the interface between the drain electrode line 3b and the first conductive layer 6a through the pinhole 14 in the developing step. In such a case, the developer may affect the drain electrode line 3b and sometimes dissolves a part thereof.

Figure 6A:
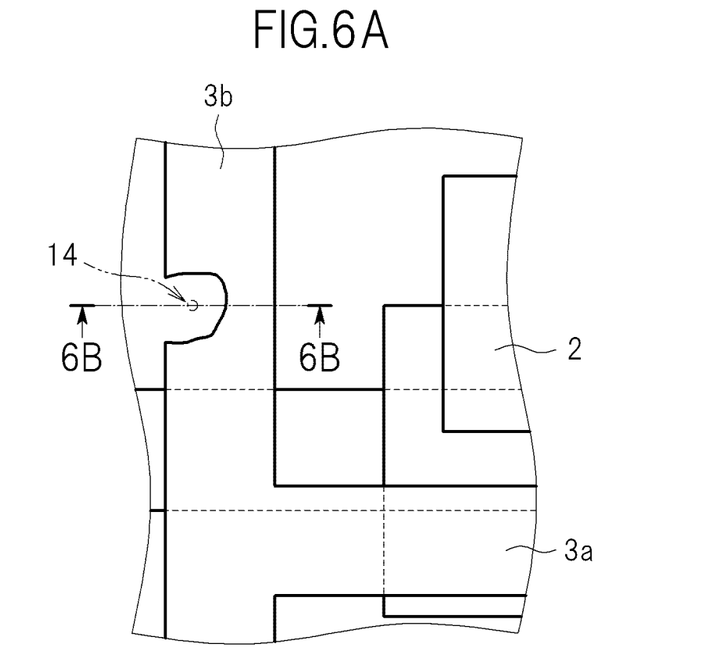
FIG. 6A is a plan view showing the vicinity of a second electrode line in a state after a development treatment in the case where a conductive film is formed of a conductive layer composed only of a first conductive layer.
Figure 6B:
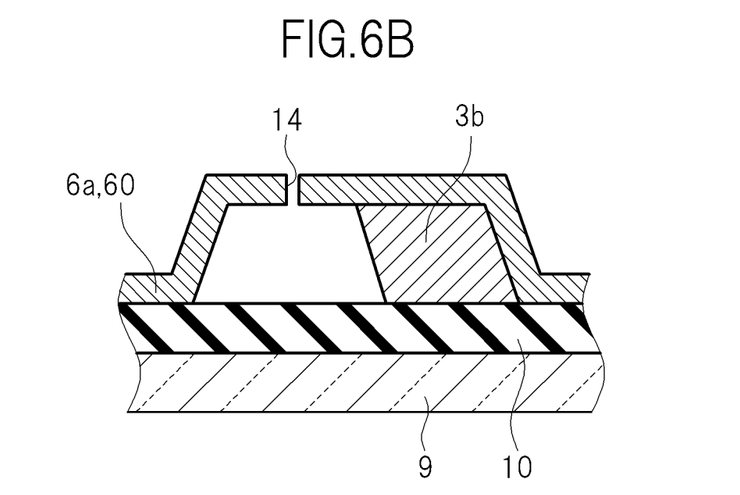
FIG. 6B is a cross-sectional view taken along the line 6B-6B of FIG. 6A.

As the developer, any of various developers such as petroleum-based solvents and alkaline aqueous solutions is used. The use of an alkaline aqueous solution as the developer is preferred from the viewpoint of environmental aspects. FIG. 6A is a plan view showing the vicinity of the drain electrode line 3b in a state after the development treatment in the case where the pixel electrode 6 is formed of a conductive layer composed only of the first conductive layer 6a. Further, FIG. 6B is a cross-sectional view taken along the line 6B-6B of FIG. 6A. FIGS. 6A and 6B are view showing a state where a part of the drain electrode line 3b is dissolved when an alkaline aqueous solution is used as the developer.

As shown in FIG. 6A, in the case where a display device includes a drain electrode line 3b a part of which has a small line width, a serious image defect is caused in the display device. For example, as the line width of the drain electrode line 3b is decreased, the resistance of the drain electrode line 3b is increased to cause uneven display or the like in the display device, and therefore, the yield in the manufacturing of the display device is decreased.

Figure 7:
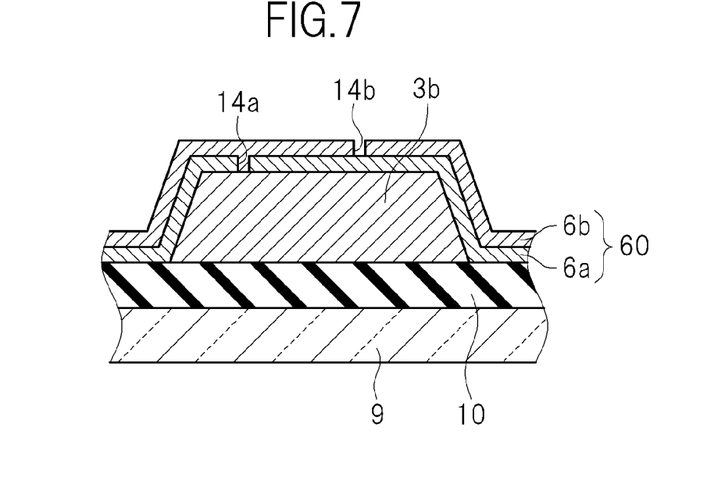
FIG. 7 is a partial cross-sectional view showing the vicinity of a second electrode line in a state before a development treatment of a display device according to an embodiment of the invention.

FIG. 7 is a partial cross-sectional view showing the vicinity of the drain electrode line 3b in a state before the development treatment of the display device according to an embodiment of the invention. In the case where a pinhole 14a is formed in a state where the first conductive layer 6a is formed, the pinhole 14a is buried with the second conductive layer 6b. Therefore, the developer is prevented from penetrating into the interface between the drain electrode line 3b and the first conductive layer 6a. Also in the case where a pinhole 14b is formed in a state where the second conductive layer 6b is formed, the first conductive layer 6a prevents the developer from penetrating into the interface between the drain electrode line 3b and the first conductive layer 6a.

That is, the drain electrode lines 3b are not exposed to the developer, and therefore, it is possible to obtain a display device having the drain electrode lines 3b in a predetermined pattern.

Since an alkaline aqueous solution is highly reactive with a metal such as chromium, the effect of the invention is further increased when a metal such as chromium is used for the source electrode film 2 and the drain electrode film 3, and an alkaline aqueous solution is used as the remover.

Incidentally, the pinhole 14 is formed with a fixed probability in the first conductive layer forming step. Further, the probability of forming the pinhole 14 in the second conductive layer forming step is also equal to the probability of forming the pinhole 14 in the first conductive layer forming step. That is, the probability of forming a pinhole at the same location by performing the first conductive layer forming step and the second conductive layer forming step is about the square of the fixed probability and can be reduced to a very small value.

Accordingly, the display device according to an embodiment of the invention is a display device including: a gate electrode film; an insulating film provided on the gate electrode film; an electrode film made of a metal provided on the insulating film; a first transparent conductive layer connected to the electrode film; and a second transparent conductive layer formed in contact with the first transparent conductive layer.

Further, the display device according to an embodiment of the invention may be a display device, wherein a location of a lost portion of the first transparent conductive layer is different from that of the second transparent conductive layer in a plan view.

By using the manufacturing method of a display device according to an embodiment of the invention, in the step of forming pixel electrodes in predetermined regions in contact with a part of the source electrode film, a portion of the source electrode film or the drain electrode film can be prevented from being lost, and moreover, the yield in the manufacturing of the display device can be prevented from decreasing.

Incidentally, after the above-mentioned second conductive layer forming step, a step of further forming a conductive layer on the upper surface of the second conductive layer may be performed. That is, the conductive layer forming step may include: the first conductive layer forming step of forming the first conductive layer 6a in contact with the respective upper surfaces of the source electrode film 2 and the drain electrode film 3; the washing step of washing the upper surface of the first conductive layer 6a; the second conductive layer forming step of forming the second conductive layer 6b covering the upper surface of the first conductive layer 6a; and a step of forming a third conductive layer having at least one layer covering the upper surface of the second conductive layer 6b.

In the case of forming the third conductive layer, since the third conductive layer has at least one layer, the resulting formed conductive layer 60 is composed of at least three layers.

Further, each layer constituting the third conductive layer is preferably transmissive to visible light. For example, the layer constituting the third conductive layer is preferably formed of ITO, InZnO, ZnO, $SnO_2$, or the like.

Further, the respective layers constituting the third conductive layer may be formed of the same material. For example, the layers constituting the third conductive layer may be formed of ITO, respectively.

Further, the respective layers constituting the third conductive layer may be formed to have the same thickness or different thicknesses.

By performing the step of further forming a conductive layer on the upper surface of the second conductive layer after the second conductive layer forming step, the yield in the manufacturing of the display device can be further prevented from decreasing.

Incidentally, as the display device according to an embodiment of the invention, an IPS mode liquid crystal display device is described in the above; however, the invention is not limited to the IPS mode liquid crystal display device and may be applied to other in-plane switching mode liquid crystal display devices, and vertically aligned (VA) mode, twisted nematic (TN) mode, and other drive mode liquid crystal display devices, and also may be applied to other display devices.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A manufacturing method of a display device that includes:
    a gate electrode film;
    a first electrode film and a second electrode film, both of which are disposed separated from the gate electrode film by an insulating film; and
    a conductive film which is connected to the first electrode film and is formed of a conductive layer including a first conductive layer and a second conductive layer formed overlapping the first conductive layer, the method comprising the steps of:
    forming the first electrode film and the second electrode film;
    forming the conductive layer such that the conductive layer is connected to the first electrode film and the second electrode film; and
    forming the conductive film by removing regions other than predetermined regions of the conductive layer;
    wherein the conductive layer forming step includes the steps of:
    forming the first conductive layer on the respective upper surfaces of the first electrode film and the second electrode film;
    forming the second conductive layer on the upper surface of the first conductive layer; and
    washing the upper surface of the first conductive layer after the first conductive layer forming step and before the second conductive layer forming step.

2. The manufacturing method according to claim 1, wherein the conductive film forming step includes the steps of:
    applying a resist on the upper surface of the conductive layer; and
    removing the resist formed in regions other than the predetermined regions using a remover.

3. The manufacturing method according to claim 2, wherein the remover is an alkaline aqueous solution, and the first electrode film and the second electrode film are made of a metal.

4. The manufacturing method according to claim 3, wherein the metal is chromium, molybdenum, or an alloy thereof.

5. The manufacturing method according to claim 1, wherein the conductive film is transmissive to visible light.

6. The manufacturing method according to claim 2, wherein the conductive film is transmissive to visible light.

7. A manufacturing method of a display device that includes:
    a gate electrode film;
    a first electrode film and a second electrode film, both of which are disposed separated from the gate electrode film by an insulating film; and
    a conductive film which is transmissive to variable light, is connected to the first electrode film, and is formed of a conductive layer including a first conductive layer and a second conductive layer formed overlapping the first conductive layer, the method comprising the steps of:
    forming the first electrode film and the second electrode film;
    forming the conductive layer such that the conductive layer is connected to the first electrode film and the second electrode film; and
    forming the conductive film by removing regions other than predetermined regions of the conductive layer,
    wherein the conductive layer forming step includes the steps of:
    forming the first conductive layer on the respective upper surfaces of the first electrode film and the second electrode film;
    forming the second conductive layer on the upper surface of the first conductive layer; and
    the first conductive layer and the second conductive layer are made of the same material, respectively.

8. The manufacturing method according to claim 6, wherein the first conductive layer and the second conductive layer are made of the same material, respectively.

9. The manufacturing method according to claim 1, wherein the display device is an in-plane switching mode liquid crystal display device.

10. A display device, comprising:
    a gate electrode film;
    an insulating film provided on the gate electrode film;
    an electrode film made of a metal and provided on the insulating film;
    a first transparent conductive layer connected to the electrode film; and
    a second transparent conductive layer formed in contact with the first transparent conductive layer;
    wherein the first conductive layer and the second conductive layer are made of the same material, respectively.

11. The display device according to claim 10, wherein a location of a lost portion of the first transparent conductive layer is different from that of the second transparent conductive layer in a plan view.

* * * * *